United States Patent [19]

Witt

[11] 4,392,990

[45] Jul. 12, 1983

[54] HEATING SILICA GEL IN INERT ATMOSPHERE BEFORE ACTIVATION

[75] Inventor: Donald R. Witt, Bartlesville, Okla.

[73] Assignee: Phillips Petroleum Company, Bartlesville, Okla.

[21] Appl. No.: 340,937

[22] Filed: Jan. 20, 1982

[51] Int. Cl.³ .......................... B01J 21/06; B01J 23/26
[52] U.S. Cl. ..................................... 252/458; 252/452
[58] Field of Search .................. 252/452, 458; 526/106

[56] References Cited

U.S. PATENT DOCUMENTS

| | | | |
|---|---|---|---|
| 4,081,407 | 3/1978 | Short et al. | 252/458 |
| 4,151,122 | 4/1979 | McDaniel et al. | 252/458 |
| 4,247,421 | 1/1981 | McDaniel et al. | 252/458 |

*Primary Examiner*—Carl F. Dees

[57] ABSTRACT

A silica hydrogel is contacted with a hydroxy-containing organic compound which is not completely miscible with water but which is sufficiently miscible with water so as to remove water, and thereafter the organic compound is removed by heating in an inert atmosphere prior to activation by heating in air. The heating in the inert atmosphere allows utilizing preferred organic compounds such as $C_5$ and $C_6$ alcohols which are desirable from a commercial standpoint because of the easy separation for recycle. In a preferred embodiment, the hydrogel is aged at a pH of 7 to 9 by means of either adding a base or by utilizing a chromium component containing bound nitrogen.

24 Claims, No Drawings

HEATING SILICA GEL IN INERT ATMOSPHERE BEFORE ACTIVATION

BACKGROUND OF THE INVENTION

Supported chromium catalysts have long been a dominant factor in the production of high density olefin polymers such as polyethylene. As originally commercialized, these catalysts were used in solution polymerization processes. However, it early became evident that a more economical route to many commercial grades of olefin polymers was a slurry process, that is, a polymerization process carried out at a temperature low enough that the resulting polymer is largely insoluble in the diluent. However, certain control techniques which are easily carried out in solution polymerization systems become more difficult in the slurry system. This is particularly true with regard to control of molecular weight. In a solution system, the temperature can simply be increased in order to provide a lower molecular weight, higher melt flow polymer. However, in slurry systems, there is a practical limit on temperature increases, since the point is quickly reached wherein the polymer goes into solution and thus the value of the slurry system is lost.

In order to allow maximum utilization of the more commercially desirable slurry system, modifications of the catalyst system have been developed so as to allow the production of higher melt flow polymer. One such modification which has been utilized is to remove water from the silica at the hydrogel stage by means of azeotropic distillation or washing with a water miscible organic compound such a ethyl acetate. Of course, it is well known that there are many organic compounds which are miscible with water and thus capable of aiding in drying water from a substance.

It has been found, unfortunately, that some of the most desirable organic liquids for use in removing water from many standpoints turn out to be unacceptable when actually attempted on a commercial scale.

SUMMARY OF THE INVENTION

It is an object of this invention to provide an improved process for utilizing a water miscible liquid for drying a silica hydrogel;

It is a further object of this invention to provide a catalyst capable of giving high melt flow polymer;

It is yet a further object of this invention to provide an improved process for making supported chromium olefin polymerization catalysts;

It is still yet a further object of this invention to provide an improved process for producing a silica-titania-chromium tergel;

It is still yet a further object of this invention to provide an improved catalyst; and It is still yet a further object of this invention to provide an improved olefin polymerization process.

In accordance with this invention, a silica hydrogel is contacted with a hydroxy-containing organic compound which is not completely miscible with water but which is sufficiently miscible with water so as to remove water, and thereafter the organic compound is removed by heating in an inert atmosphere prior to activation by heating in air.

DESCRIPTION OF THE PREFERRED EMBODIMENTS

Broadly, the process of producing the hydrogel involves mixing an aqueous solution of an alkali metal silicate with a strong acid such as sulfuric acid. This mixing can be done under suitable conditions, for instance by means of agitation. The concentration of the $SiO_2$ in the hydrogel which is formed is usually in the range of about 3 to 12 weight percent. A wide range of mixing temperatures can be employed, for instance from about 33° to 110° F. (1° to 43° C.). This process is broadly disclosed in my prior patent U.S. Pat. No. 3,900,457, the disclosure of which is hereby incorporated by reference.

After gellation, the mixture is aged. This can be carried out at temperatures within the range of about 65° F. (18° C.) to 200° F. (93° C.). Generally aging times of 1 hour or greater are used, for instance, times of 1 hour to 20 hours, preferably 2 to 10 hours are suitable. Following the aging, the gel may be agitated to produce a slurry which is washed several times with water and with either an ammonium salt or dilute acid to reduce the alkali metal content of the gel to less than about 0.1 weight percent. While various ammonium salts and dilute acid solutions can be employed, the preferred salts are those such as ammonium nitrate and ammonium salts of organic acids which decompose and volatilize on subsequent calcination.

In the prior art, water is removed from the hydrogel by washing with a normally liquid volatile organic compound which is miscible with water or by azeotropic distillation employing such an organic compound as disclosed in said U.S. Pat. No. 3,900,457. For instance, ethyl acetate can be employed to remove the water. However, the miscibility of water in ethyl acetate at the azeotrope temperature is so low that a large amount of time is required to remove water, thus making it less desirable from a commercial standpoint. It has been attempted to substitute hydroxy-containing organic liquids such as 3-methyl-1-butanol, 1-pentanol and 1-hexanol, which would be more desirable from a commercial standpoint because water has high miscibility at azeotrope temperature with these materials and yet they can be easily separated from water. However, these materials have resulted in an unexplained tendency for the resulting catalyst to be unacceptable because of producing higher molecular weight polymer (lower melt flow polymer).

In accordance with this invention, it has been discovered unexpectedly that if the gel after washing with the hydroxy-containing organic liquid compound is subjected to a high temperature treatment in an inert atmosphere prior to heating in air (calcination), results were obtained which are as good or even better than the results obtained with ethyl acetate and in addition separation procedure is greatly facilitated.

While not wishing to be bound by theory, applicant speculates that with the hydroxy-containing compounds a portion thereof become bonded to the silica surface in some manner, perhaps by forming esters with the hydroxy groups on the silica with the result that instead of volatilizing off when first contacted with hot air, they remain until a temperature is reached at which they are burned forming water which probably injures both the silica base and the chromium component of the catalyst.

Suitable hydroxy-containing normally liquid organic compounds or mixtures thereof for use in accordance with this invention are those having a solubility in water of less than 6 grams per 100 grams of water, preferably less than 5 grams per 100 grams of water at room temperature. Most preferred are saturated aliphatic alcohols containing 5 and 6 carbon atoms per molecule selected from 1-pentanol, 2-pentanol, 3-methyl-1-butanol, 4-methyl-2-pentanol, 2,2-dimethyl-1-propanol, and 1-hexanol. Most preferred are 1-pentanol, 3-methyl-1-butanol and 1-hexanol.

The inert atmosphere for heating after removal of water but before heating in air (calcination) is preferably nitrogen although a vacuum or any inert atmosphere such as carbon dioxide, helium, or other nonoxidizing and nonreducing ambients can be utilized.

The heating temperature in the inert atmosphere can vary widely but generally will be within the range of 600° to 1800° F. (316° to 982° C.), preferably 800° to 1600° F. (427° to 871° C.).

The heating time in the inert atmosphere can vary widely, of course, longer times generally being used with lower temperatures and vice versa. Generally times of 5 minutes to 2 hours, preferably 15 minutes to an hour are utilized, these being effective to remove components which produce catalyst poisons when contacted with air at high temperatures.

The heating in an inert atmosphere is generally done by flowing the inert ambient through the catalyst, for instance in a fluidized bed or while the catalyst is in a rotary dryer. In a preferred embodiment, the heating in the inert ambient is simply carried out in the same means utilized for the activation such as a rotary dryer. These operations can be carried out on either a batch or continuous process although a batch process is generally used.

The silica prior to the time it is heated in the air ambient (calcination) will have the chromium contained therein. Chromium can be incorporated in a number of ways all of which are known in the art. The chromium can be, for instance, co-gelled with the silica or it can be added to the hydrogel, for instances in aqueous solution, or it can be added as a nonaqueous solution to the xerogel resulting from the removal of water from the hydrogel. Conventional chromium compounds can be utilized such as chromium trioxide, tertiary butyl chromate, chromium acetyl acetonate, chromium nitrate, or chromium acetate, for instance. Alternatively, coordination chromium compounds having nitrogen-containing groups, such as chloropentamine chromium(III) chloride as will be discussed in more detail hereinafter, can be used.

The chromium compound is generally incorporated in an amount sufficient to give 0.001 to 10, preferably 0.1 to 5, most preferably about 1 weight percent chromium based on the weight of the dried silica base (xerogel).

In the description herein the term "cogel" is arbitrarily used to describe co-gelled silica and titania, and the term "co-gelled silica-chromium" is used to describe a two-component silica-chromium hydrogel. The term "tergel", of course, is used to describe the product resulting from the co-gellation together of silica, titania, and chromium.

When titanium is used, it is usually used in an amount within the range of 0.1 to 10, preferably 0.5 to 5 weight percent based on the weight of the dry silica gel. Suitable titanium compounds include the halides such as TiCl$_3$ and TiCl$_4$, the nitrates, the sulfates, the oxalates, and alkyl titanates, for instance. It is generally preferred that the silica be a silica-titania-chromium tergel.

Throughout this application, the reference to silica means a silica-containing material generally composed of 80 to 100 weight percent silica, the remainder, if any, being selected from alumina, boria, thoria, zirconia, or mixtures thereof, for instance. The silica-containing material can consist essentially of silica and no more than 0.2 weight percent of alumina or other metal oxide. Other ingredients which do not adversely affect the catalyst but which are present to produce some unrelated result can also be present and, as noted hereinabove, titania is present in the preferred embodiments.

Following the heat treatment in an inert atmosphere, the catalyst is subjected to a conventional activation or calcination treatment in an oxygen-containing ambient such as air. The activation temperature will generally be about 800° to 2000° F. (427° to 1093° C.), preferably 1200° to 1500° F. (649° to 816° C.).

In a preferred embodiment, the aging process is carried out at a pH within the range of 7 to 9. This can be obtained by adding a basic material such as ammonia or ammonium hydroxide. This is preferably done by adding the basic material to the hydrogel slurry before aging either alone or in combination with additional basic material during the aging process since there is a tendency for the pH to decrease during aging. Alternatively, it is possible in some instances to simply add the basic material during aging so as to preclude the pH decrease. Other suitable basic materials include ammonium carbonate, triethylamine, dimethylamine, and guanidine.

Alternatively, a chromium compound having nitrogen-containing groups can be utilized which inherently results in a higher pH and/or which has less of a tendency to produce a pH decrease during aging. Such chromium compounds include coordination compounds, double salts, and chelates. For example, one class of useful compounds is shown by the formula CrX$_3$.yNH$_3$ where X is a halogen ion such as Cl$^-$, Br$^-$, I$^-$ and y is an integer ranging from 1 to 6, e.g. CrCl$_3$.6NH$_3$.

Another class of useful chromammine compounds containing 6 neutral groups is shown by the formula [CrA$_6$]Z$_3$ in which A can be at least one NH$_3$, ethylenediamine (en), and unsymmetrical propylenediamine (pn) and Z, an acid radical, can be a halogen ion as above, NO$_3^-$, SO$_4^{-2}$ and PO$_4^{-3}$. In some instances H$_2$O can replace a portion of A. Some examples of these include: [Cr(NH$_3$)$_6$9 (NO$_3$)$_3$, [Cr(en)$_3$]Cl$_3$, [Cr(NH$_3$)$_2$(H$_2$O)$_4$]Br$_3$, [Cr(NH$_3$)$_5$H$_2$O]Cl$_3$, [Cr(pn)$_2$(H$_2$O)$_2$]SO$_4$ and the like.

Still another class of useful chromammine compounds containing 5 neutral groups is shown by the formulae: [CrA$_5$Y]Z$_2$ where A and Z are as before and Y is a radical from a monobasic acid such as Cl$^-$, Br$^-$, I$^-$, NO$_2^-$, NO$_3^-$, OH$^-$ and CNS$^-$; and [CrA$_5$W]V where A is as before, V is Cl$^-$, Br$^-$, I$^-$, OH$^-$, and W is a radical from a dibasic acid such as SO$_3^{=2}$, SO$_4^{-2}$, CO$_3^{-2}$ and C$_2$O$_4^{-2}$. Some examples of these include: [Cr(NH$_3$)$_5$Cl]Cl$_2$, [Cr(NH$_3$)$_3$(H$_2$O)$_2$(OH)]Cl$_2$, [Cr(NH$_3$)$_5$SO$_4$]Cl and [Cr(NH$_3$)$_5$CO$_3$]NO$_3$.

Presently preferred compounds include chloropentammine chromium(III) chloride and hexamminechromium(III) nitrate because of reasonable availability.

A more extensive review of the coordination compounds is presented in Inorganic Chemistry by P. C. L. Thorne and E. R. Roberts, 5th Ed, Revised, Interscience Publishers, Inc. 1948, pages 320-322, the disclosure of which is hereby incorporated by reference.

The catalyst of this invention can be used to polymerize at least one mono-1-olefin containing 2 to 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexane, 4-methyl-1-pentene, 1-octene, and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 97 to 99.8 weight percent polymerized ethylene units. With ethylene/hexene copolymers, about 98 to 99.8 mole percent ethylene is preferred, the remainder, of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in my patent U.S. Pat. No. 3,624,603, the disclosure of which is hereby incorporated by reference.

The catalyst of this invention is particularly suitable for use in slurry polymerizations. The slurry process is generally carried out in an inert diluent (medium) such as paraffin, cycloparaffin or aromatic hydrocarbon. For predominantly ethylene polymers, a temperature of about 66° to 110° C. is employed. Pressures in the particle form process can vary from about 110 to about 700 psia (0.76-4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight as is known in the prior art. When used it is generally used at concentrations up to 2 mole percent of reaction mixture, preferably within the range of 0.1 to 1 mole percent of reaction mixture.

EXAMPLE I

About 10 grams of dry, raw silica-titania-chromium oxide tergel (converted from a hydrogel to a xerogel by means of contact with an alcohol) containing about 1 weight percent chromium as chromium oxide, about 2.5 weight percent titanium as titanium dioxide and the remainder as silica, was charged at room temperature to a quartz activator tube about 45 mm inner diameter containing a porous ceramic plate near the bottom. The tube containing the catalyst was flushed with dry nitrogen for 20 minutes and then placed into a furnace while passing about 42 standard liters per hour of dry nitrogen through it to obtain a fluidized bed. The catalyst charge attained the furnace temperature in about 10 to 15 minutes. Unless specified otherwise, the catalyst was held for 1 hour at the indicated temperature, then cooled to room temperature in a nitrogen atmosphere. The following day the catalyst samples were activated for polymerization by heating each sample in dry air (42 standard liters/hour) for 5 hours at 1600° F. (870° C.), then cooled to room temperature in dry air, recovered and stored in dry air until ready for use.

Ethylene was polymerized in contact with each catalyst under particle form conditions at about 109° C. (228° F.) and a reactor pressure of about 565 psia (3.90 MPa) in a 2-liter stirred stainless steel reactor containing about 1.25 lbs (567 g) of isobutane as a diluent until a yield of about 4,000 parts by weight of polymer per part by weight of catalyst charge was produced. The reaction was terminated by discontinuing reactor heating and ethylene flow and flashing the volatiles. The polymer was recovered, dried and weighed to determine the yield. The melt index of each polymer was determined in accordance with ASTM D 1238-65T, Condition E and was corrected, if necessary, to a common 4,000 g polymer per g catalyst level as is known in the art, e.g. see U.S. Pat. No. 4,151,122, column 7, line 66 to line 2, column 8.

The results are given in Table I.

TABLE I

Ethylene Polymerization
Fluidized Bed Catalyst Pretreatment

| Run No. | Pretreatment Temperature In Nitrogen °F. | Pretreatment Temperature In Nitrogen °C. | Polymerization[a] Activity g/g cat/hr | Polymer Melt Index |
|---|---|---|---|---|
| 1 | None | — | 4970 | 4.9 |
| 2 | 800 | 427 | 5780 | 5.4 |
| 3 | 1000 | 538 | 6400 | 5.0 |
| 4 | 1200 | 649 | 5780 | 5.7 |
| 5[b] | 1200 | 649 | 6150 | 5.6 |
| 6 | 1500 | 816 | 7270 | 6.9 |

[a] grams polymer per gram catalyst per hour
[b] hold time in N$_2$ of 30 minutes.

Run 1 is a control showing that the melt index capability of the raw catalyst is reduced in the absence of a pretreatment in nitrogen at an elevated temperature.

Runs 2 and 3 show that marginal improvement in melt index capability can be obtained by pretreating the raw catalyst in nitrogen at up to about 1000° F. under the conditions employed. The major improvement, however, is shown by the significant jump in catalyst activity from about 5000 g polymer per g catalyst per hour obtained in run 1 to about 5800 to 6400 g polymer per g catalyst per hour with the pretreatment of runs 2 and 3.

Runs 4 and 5 indicate that the minimum pretreatment temperature of raw catalyst in nitrogen under the conditions used occurs at about 1200° F. and that hold times of about 30 to 60 minutes are equivalent. The activity of the catalyst remains high while the melt index capability is nearing the maximum expected, e.g., about 6 to 7.

The conditions employed in run 6 appear to be near optimum as shown by both high polymerization activity and by a polymer melt index of 6.9.

EXAMPLE II

A series of catalysts was produced from the raw dry catalyst used in Example I by employing a somewhat different preheating process in the nitrogen atmosphere. Thus, after flushing the catalyst contained in the activator tube with nitrogen as before, the nitrogen flow was reduced to about 4 standard liters/hour, then the tube was inserted in the furnace held at 800° (same temperature as in run 2) and held for 1 hour at that nitrogen flow. Each catalyst received the same treatment and each was recovered and employed in ethylene polymerization as before. A nitrogen flow of 4 L/hr results essentially in a settled catalyst bed whereas one of 42 L/hr provides a fluidized catalyst bed.

The results are given in Table II.

TABLE II

Ethylene Polymerization
Settled Bed Catalyst Pretreatment

| Run No. | Pretreatment Temperature In Nitrogen °F. | °C. | Polymerization Activity g/g cat/hr | Polymer Melt Index |
|---|---|---|---|---|
| 7 | 800 | 427 | 5910 | 7.0 |
| 8 | 800 | 427 | 6270 | 6.2 |
| 9 | 800 | 427 | 6900 | 6.3 |

The above runs were made over a period of about two months indicating reasonably good reproducibility was achieved since the target melt index range of about 6 to 7 was reached in each instance.

Comparison of runs 7, 8 and 9 with run 2 of Table I shows fairly close agreement in polymerization activity of the catalysts. However, the melt index of the polymer made in run 2 is below the desired target melt index range. The only apparent difference in catalyst preparation is that a fluidized bed is used in Example I and a settled bed is used in Example II during the pretreating process in nitrogen. The reason for the difference is not clear but it is speculated that it could be associated with the rate at which the alcohol is removed from the silica.

While this invention has been described in detail for the purpose of illustration, it is not to be construed as limited thereby but is intended to cover all changes and modifications within the spirit and scope thereof.

I claim:

1. A process comprising:
forming a silica hydrogel;
aging said hydrogel for a time of at least one hour;
treating the thus aged hydrogel with a volatile normally liquid saturated aliphatic alcohol having a solubility in water of less than 6 grams per 100 grams of water to convert said hydrogel to a xerogel;
subjecting the thus formed xerogel to a heat treatment in an inert atmosphere at an elevated temperature; and
activating the thus heat treated xerogel, said xerogel also containing chromium, in an oxygen-containing ambient for a time sufficient to activate same.

2. A method according to claim 1 wherein said silica hydrogel is a silica-titania-chromium tergel.

3. A method according to claim 1 wherein said alcohol is a $C_5$ or $C_6$ alcohol.

4. A method according to claim 3 wherein said alcohol is selected from 3-methyl-1-butanol, 1-pentanol, and 1-hexanol or mixtures thereof.

5. A method according to claim 1 wherein said inert atmosphere comprises nitrogen and wherein said heat treatment in said nitrogen is carried out for a time within the range of 15 minutes to 1 hour at a temperature within the range of 800° to 1600° F.

6. A method according to claim 1 wherein said activating is carried out in air at a temperature within the range of 1200° to 1500° F.

7. A method according to claim 6 wherein said silica is a silica-titania-chromium tergel, said aging is carried out at a temperature of 65° to 200° F. for 1 to 20 hours and said alcohol is a $C_5$ or $C_6$ alcohol, said inert atmosphere is nitrogen, said activating is carried out in air and wherein said treatment in said inert atmosphere is carried out at a temperature within the range of 800° to 1600° F. and said activating is carried out at a temperature within the range of 1200° to 1500° F.

8. A method according to claim 7 wherein said aging is carried out at a pH within the range of 7 to 9.

9. A method according to claim 8 wherein said pH is maintained within the range of 7 to 9 by means of adding a basic material to said hydrogel.

10. A method according to claim 9 wherein said basic material is selected from ammonia or ammonium hydroxide.

11. A method according to claim 8 wherein said basic material is added prior to said aging.

12. A method according to claim 8 wherein said pH is maintained at said value of 7 to 9 by means of utilizing a coordination chromium compound having nitrogen-containing groups.

13. A method according to claim 12 wherein said chromium compound is chloropentamine chromium-(III) chloride.

14. A method according to claim 12 wherein said hydrogel is a silica-titania-chromium tergel.

15. A method according to claim 1 wherein said aging is carried out at a pH within the range of 7 to 9.

16. A method according to claim 15 wherein said pH is maintained within the range of 7 to 9 by means of adding a basic material to said hydrogel.

17. A method according to claim 15 wherein said basic material is selected from ammonia or ammonium hydroxide.

18. A method according to claim 15 wherein said basic material is added prior to said aging.

19. A method according to claim 15 wherein said pH is maintained at said value of 7 to 9 by means of utilizing a coordination chromium compound having nitrogen-containing groups.

20. A method according to claim 19 wherein said chromium compound is chloropentamine chromium-(III) chloride.

21. A method according to claim 19 wherein said hydrogel is a silica-titania-chromium tergel.

22. A catalyst produced by the method of claim 1.

23. A catalyst produced by the method of claim 8.

24. A catalyst produced by the method of claim 15.

* * * * *